US010222556B2

(12) United States Patent
Nguyen

(10) Patent No.: US 10,222,556 B2
(45) Date of Patent: Mar. 5, 2019

(54) DUPLEX MINI LC CONNECTOR

(71) Applicant: Finisar Corporation, Sunnyvale, CA (US)

(72) Inventor: Long Van Nguyen, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/606,891

(22) Filed: May 26, 2017

(65) Prior Publication Data

US 2017/0343740 A1   Nov. 30, 2017

Related U.S. Application Data

(60) Provisional application No. 62/342,533, filed on May 27, 2016.

(51) Int. Cl.
*G02B 6/38* (2006.01)
*G02B 6/42* (2006.01)

(52) U.S. Cl.
CPC ......... *G02B 6/3817* (2013.01); *G02B 6/381* (2013.01); *G02B 6/3833* (2013.01); *G02B 6/3879* (2013.01); *G02B 6/428* (2013.01); *G02B 6/4246* (2013.01); *G02B 6/4284* (2013.01)

(58) Field of Classification Search
None
See application file for complete search history.

(56) References Cited

U.S. PATENT DOCUMENTS

| | | | |
|---|---|---|---|
| 4,953,929 A | 9/1990 | Basista et al. | |
| 6,422,760 B1 * | 7/2002 | Matasek | G02B 6/3879 385/53 |
| 6,604,861 B2 * | 8/2003 | Chen | G02B 6/3869 385/56 |
| 6,705,764 B2 * | 3/2004 | Shang | G02B 6/423 361/728 |
| 7,322,754 B2 * | 1/2008 | Wolf | G02B 6/4214 385/88 |

(Continued)

FOREIGN PATENT DOCUMENTS

| | | |
|---|---|---|
| EP | 0156608 A2 | 10/1985 |
| WO | 2000/077551 A1 | 12/2000 |
| WO | 2012/058185 A1 | 5/2012 |

OTHER PUBLICATIONS

Invitation to Pay Additional Fees dated Aug. 10, 2017 in related PCT Application No. PCT/US2017/034833 (11 pages).

(Continued)

*Primary Examiner* — Tina M Wong
(74) *Attorney, Agent, or Firm* — Maschoff Brennan

(57) ABSTRACT

A fiber optic connector may include a body, a first fiber ferrule, and a second fiber ferrule. The first fiber ferrule may extend in a length direction of the body from a module-side end of the body. The second fiber ferrule may extend in the length direction of the body from the module-side end of the body and may be spaced apart from the first fiber ferrule in a width direction of the body. A maximum width in the width direction of a portion of the body configured to be received in a port of an optoelectronic communication module may be less than half a width of a fiber-side end of the optoelectronic communication module.

19 Claims, 7 Drawing Sheets

(56) References Cited

U.S. PATENT DOCUMENTS

| | | | | |
|---|---|---|---|---|
| 7,354,205 | B2* | 4/2008 | Sakata | H01R 13/6594 |
| | | | | 385/53 |
| 7,766,679 | B2* | 8/2010 | Endou | G02B 6/4201 |
| | | | | 439/160 |
| 9,250,402 | B2* | 2/2016 | Ishii | G02B 6/4261 |
| 9,322,994 | B2* | 4/2016 | Brooks | G02B 6/4225 |
| 9,494,744 | B2* | 11/2016 | de Jong | G02B 6/3879 |
| 9,515,740 | B2* | 12/2016 | Cafiero | H04B 10/40 |
| 9,784,919 | B2* | 10/2017 | Wang | G02B 6/2938 |
| 2004/0131317 | A1* | 7/2004 | Grzegorzewska | G02B 6/3887 |
| | | | | 385/86 |
| 2006/0089049 | A1 | 4/2006 | Sedor | |
| 2008/0056647 | A1* | 3/2008 | Margolin | G02B 6/4201 |
| | | | | 385/89 |
| 2017/0176698 | A1* | 6/2017 | Ho | G02B 6/4214 |

OTHER PUBLICATIONS

International Search Report and Written Opinion dated Oct. 5, 2017 in related PCT Application No. PCT/US2017/034833 (18 pages).

* cited by examiner

DUPLEX MINI LC CONNECTOR

CROSS-REFERENCE TO RELATED APPLICATION

This application claims the benefit of and priority to U.S. Provisional App. No. 62/342,533, filed May 27, 2016, which is incorporated herein by reference.

FIELD

The embodiments discussed herein are related to a duplex mini lucent connector (LC) connector.

BACKGROUND

Unless otherwise indicated herein, the materials described herein are not prior art to the claims in the present application and are not admitted to be prior art by inclusion in this section.

Communication modules, such as optoelectronic transceiver modules, may include various components that engage in the transmission and reception of optical signals. Some of the components may be housed within a shell of the optoelectronic transceiver module. Examples of such components may include a transmitter optical subassembly (TOSA) and/or a receiver optical subassembly (ROSA). The optoelectronic transceiver module itself is operably received within a host device that serves as one component of a communications network.

To engage in optical communication with other communications modules, the optoelectronic transceiver module may operably connect with one or more connectorized optical fibers. The optoelectronic transceiver module may include a transmit port and/or a receive port configured to receive the connector of the optical fiber(s). Optical signals may be received and/or transmitted by the optoelectronic transceiver module via the optical fiber(s).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein may generally relate to a duplex mini LC connector.

In an example embodiment, a fiber optic connector may include a body, a first fiber ferrule, and a second fiber ferrule. The first fiber ferrule may extend in a length direction of the body from a module-side end of the body. The second fiber ferrule may extend in the length direction of the body from the module-side end of the body and may be spaced apart from the first fiber ferrule in a width direction of the body. A maximum width in the width direction of a portion of the body configured to be received in a port of an optoelectronic communication module may be less than half a width of a fiber-side end of the optoelectronic communication module.

In another example embodiment, an optoelectronic communication module may include a housing, first and second duplex ports, and a pull latch. The first duplex port may be formed in a fiber-side end of the housing and may be configured to receive a first duplex fiber optic connector. The second duplex port may be formed in the fiber-side end of the housing spaced apart from the first duplex port in a width direction of the housing and may be configured to receive a second duplex fiber optic connector. The pull tab latch may include a slider and a pull tab. The slider may surround a top, two sides, and a bottom of the fiber-side end of the housing. The pull tab may be overmolded over at least a portion of a top of the slider and may not be overmolded over any of two sides or a bottom of the slider.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Some embodiments described herein relate to a duplex mini LC connector that may be implemented together with another such duplex mini LC connector as part of a dual duplex optical interface of an optoelectronic communication module. The optoelectronic communication module may include a Quad Small Form-factor Pluggable (QSFP) module or other suitable optoelectronic communication module.

Reference will now be made to the drawings to describe various aspects of some example embodiments of the disclosure. The drawings are diagrammatic and schematic representations of such example embodiments, and are not limiting of the present disclosure, nor are they necessarily drawn to scale.

Figure 1A:
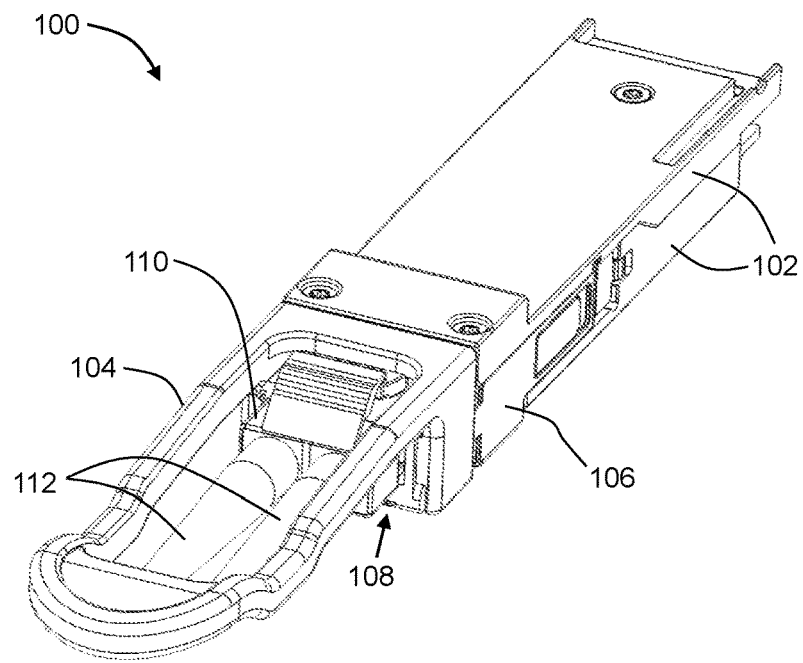
FIGS. 1A and 1B include a perspective view and a fiber-side end view of an example optoelectronic communication module (hereinafter "module")
Figure 1B:
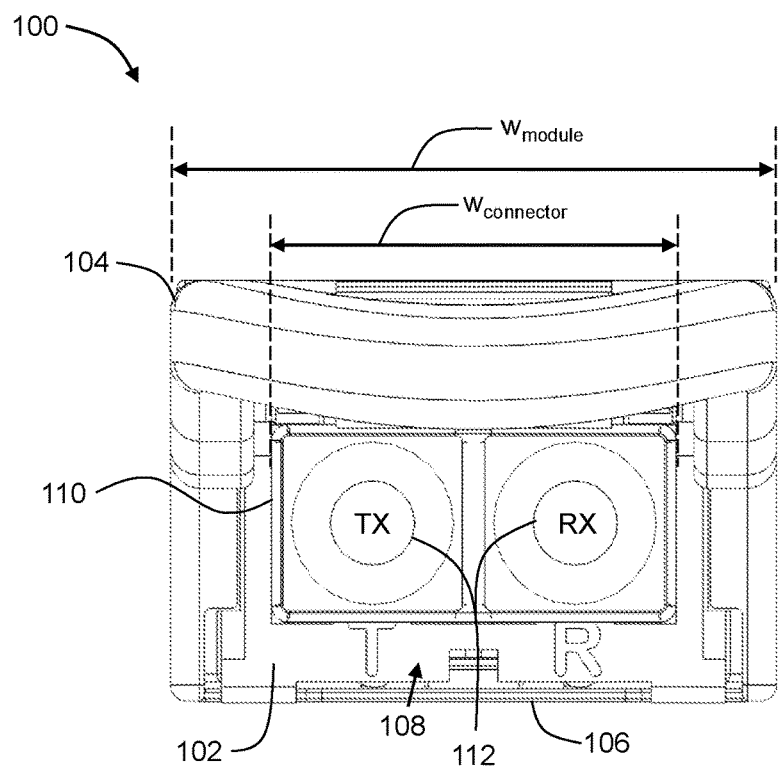

FIGS. 1A and 1B include a perspective view and a fiber-side end view of an example optoelectronic communication module (hereinafter "module") 100. The module 100 may include a QSFP module, meaning the module 100 may comply with the QSFP multisource agreement (MSA). The module 100 includes a housing 102, a pull tab 104, and a slider 106.

The pull tab 104 is coupled to the slider 104 and may be used to remove the module 100 from a host device by pulling on the pull tab 104. The slider 106 (sometimes referred to as a latch follower) is configured to move relative to the housing 102 (within a permitted range of relative motion) in response to sufficient force being exerted thereon by the pull tab 104 to thereby delatch the module 100 from the host device. U.S. Pat. No. 6,908,323 describes in general how such a slider may operate, although the slider in the '323 patent is bail operated as opposed to pull tab operated in the module 100 of FIGS. 1A and 1B.

The housing 102 as illustrated includes a top shell and a bottom shell coupled together to form a cavity within which various components may be disposed, such as a printed circuit board assembly (PCBA), a TOSA, and a ROSA. In other embodiments, the housing 102 may include a unitary piece with one or more of the foregoing components disposed therein. A duplex port 108 (e.g., a two-way port) is formed in the housing 102. The duplex port 108 is sized and otherwise configured to receive therein a duplex fiber optic connector (hereinafter "connector") 110. The connector 110 may include a duplex standard LC connector.

The connector 110 includes two ferrules that extend from a module-side end of the connector outward. One of the ferrules of the connector 110 is configured to be optically aligned with a port of the TOSA disposed within the housing 102, while the other one of the ferrules of the connector 110 is configured to be optically aligned with a port of the ROSA disposed within the housing 102. The two ferrules may include optical fibers to carry optical signals emitted by the TOSA out into an optical network or to carry optical signals from the optical network to the ROSA. Each of the two ferrules is optically aligned with a corresponding one of two optical fibers 112 that extend outward from a fiber-side end of the connector 110. The optical fiber 112 aligned with the ferrule that is aligned with the TOSA is labeled "TX" in FIG. 1B while the optical fiber 112 aligned with the ferrule that is aligned with the ROSA is labeled "RX" in FIG. 1B.

FIG. 1B additionally depicts various measurements associated with the module 100 and the connector 110 of FIGS. 1A and 1B. In particular, a width of the module 100, referred to as the module width $w_{module}$, may be 18.35 millimeters (mm), and a width of the connector 110, referred to as the connector width $w_{connector}$, may be about 12.5 mm. Because the connector width $w_{connector}$ is much more than half the module width $w_{module}$, it would be impossible to accommodate two of the connector 110 at the fiber-side end of the module 100. Embodiments described herein relate to a redesigned connector small enough for two such connectors to be accommodated at the fiber-side end of an optoelectronic communication module such as the module 100, where the optoelectronic communication module may also be redesigned to include two ROSAs and two TOSAs to, e.g., double bandwidth of the redesigned optoelectronic communication module compared to the module 100.

Figure 2A:
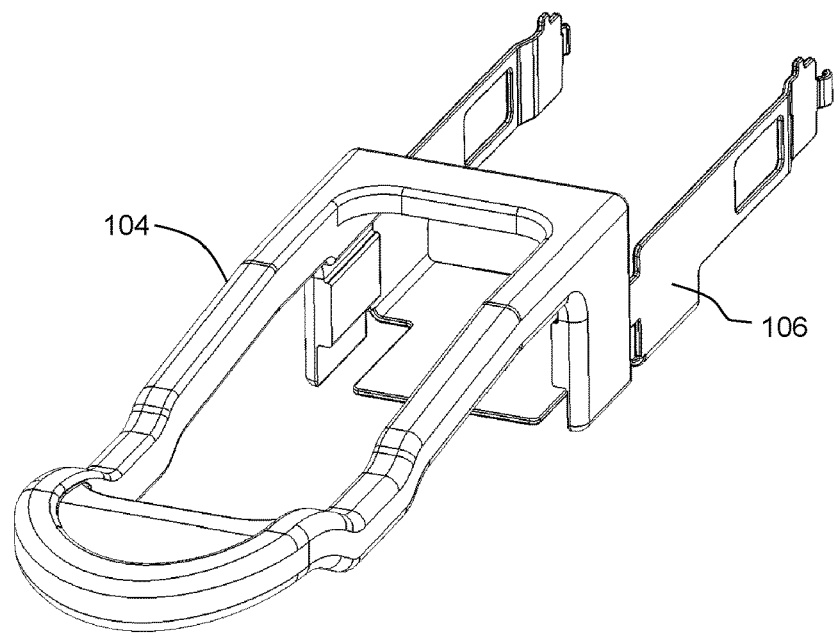
FIGS. 2A and 2B include a perspective view and a fiber-side end view of a pull tab and a slider of the module of FIGS. 1A and 1B.
Figure 2B:
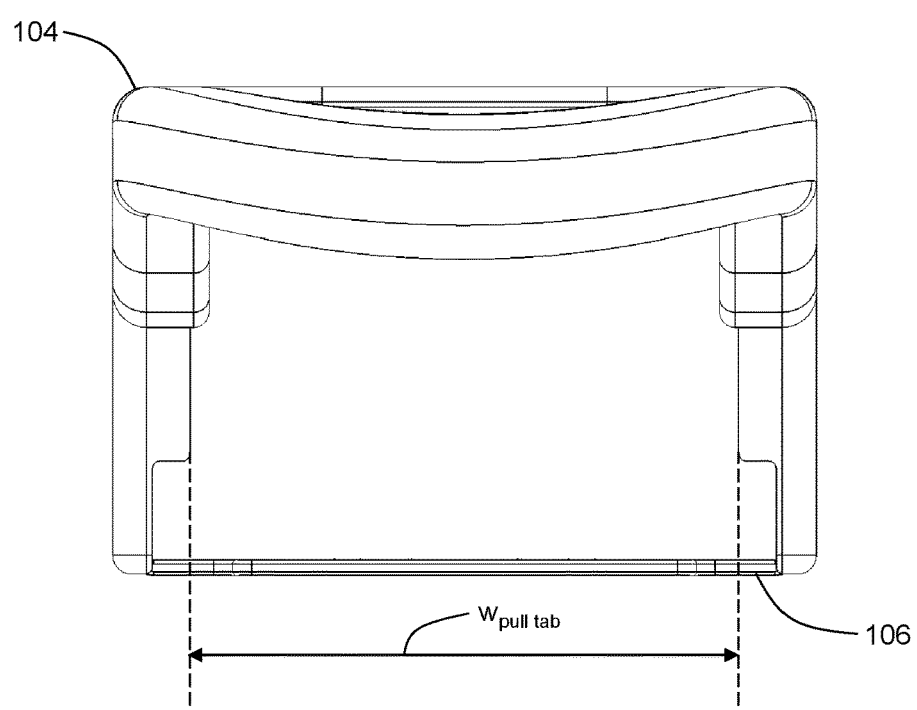

FIGS. 2A and 2B include a perspective view and a fiber-side end view of the pull tab 104 and the slider 106 of the module 100 of FIGS. 1A and 1B. The pull tab 104 may include plastic or rubber overmolded onto (e.g., molded over) a top and sides of a fiber-side end of the slider 106, and the slider 106 may include formed sheet metal. As indicated in FIG. 2B, and due to the overmolded plastic/rubber of the pull tab 104 on the sides of the fiber-side end of the slider 106, an opening width of the combined pull tab 104 and slider 106, referred to as the pull tab width $w_{pull\ tab}$, is about 14.6 mm. In the module 100 of FIGS. 1A and 1B, the pull tab width $w_{pull\ tab}$ of about 14.6 mm denoted in FIG. 2B may limit a maximum width of a fiber optic connector (or multiple connectors) that can be accommodated by the module 100.

Figure 3A:
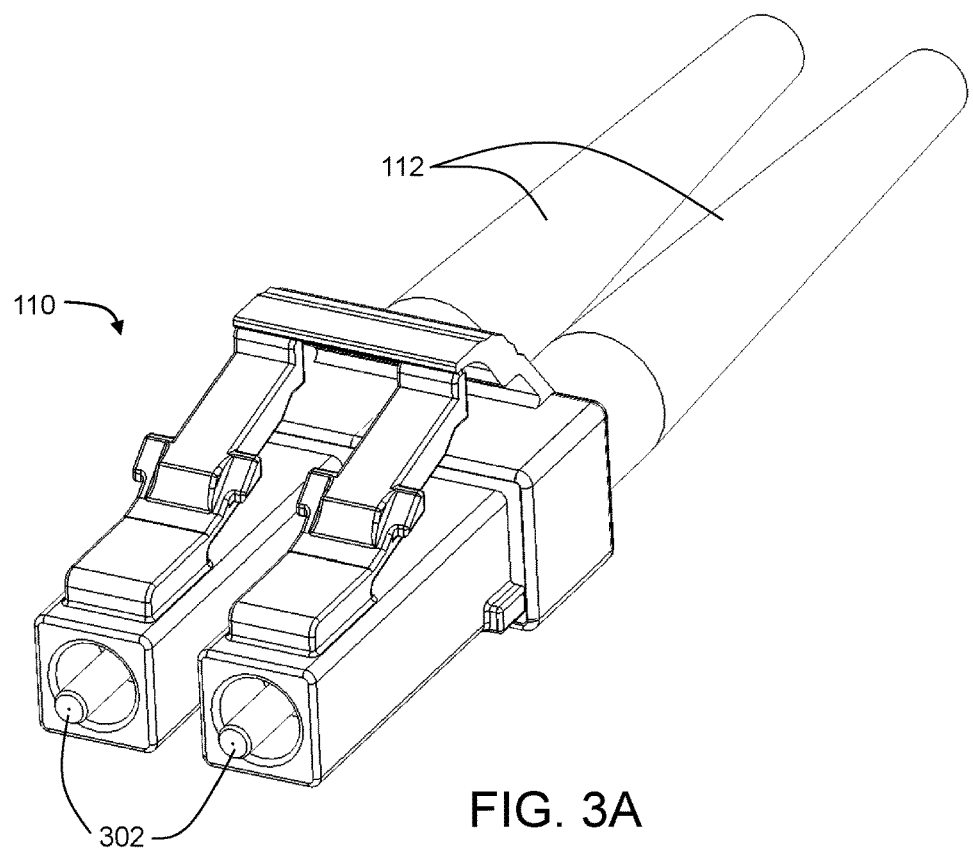
FIGS. 3A and 3B include a perspective view and a module-side end view of a connector and optical fibers of FIGS. 1A and 1B.
Figure 3B:
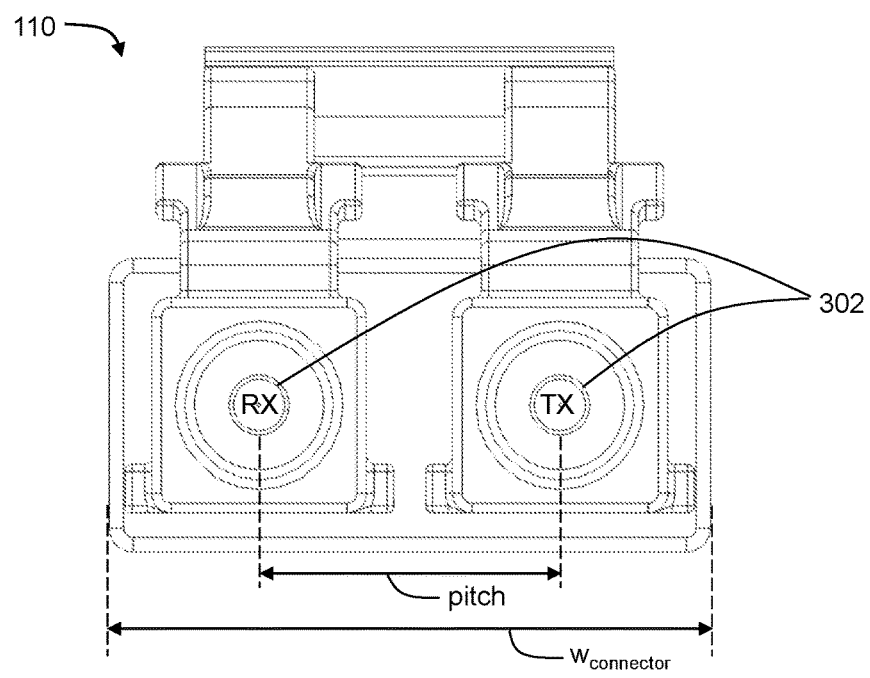

FIGS. 3A and 3B include a perspective view and a module-side end view of the connector 110 and optical fibers 112 of FIGS. 1A and 1B. Ferrules of the connector 110 are denoted in FIGS. 3A and 3B at 302. FIG. 3B additionally indicates the connector width $w_{connector}$ of the connector 110, which may be about 12.5 mm, and a pitch (e.g., center-to-center spacing) of the ferrules 302, which may be about 6.25 mm.

Figure 4A:
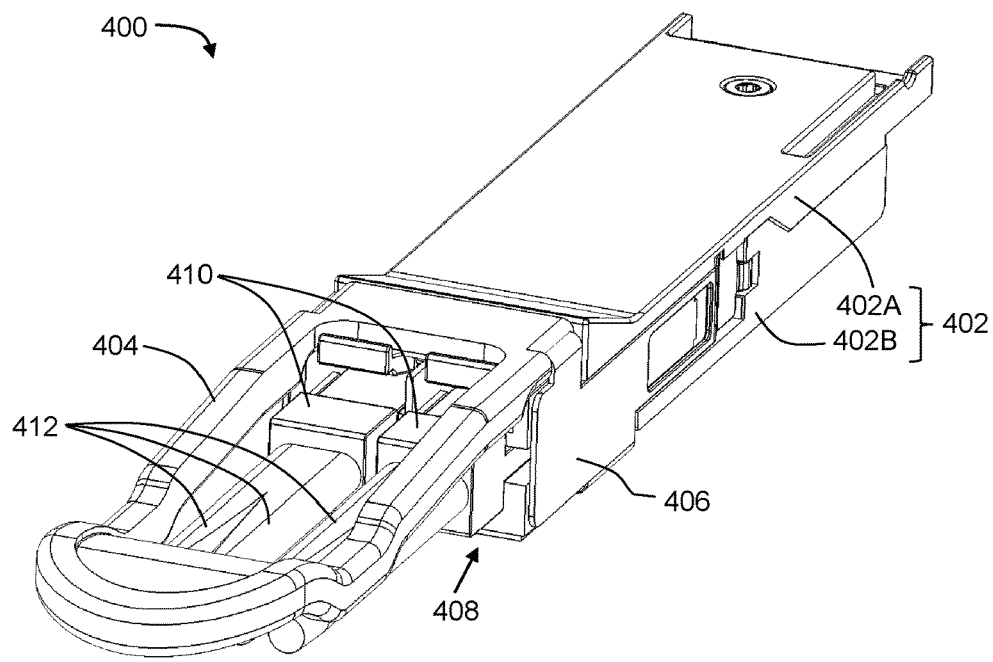
FIGS. 4A and 4B include a perspective view and a fiber-side end view of another example optoelectronic communication module (hereinafter "module")
Figure 4B:
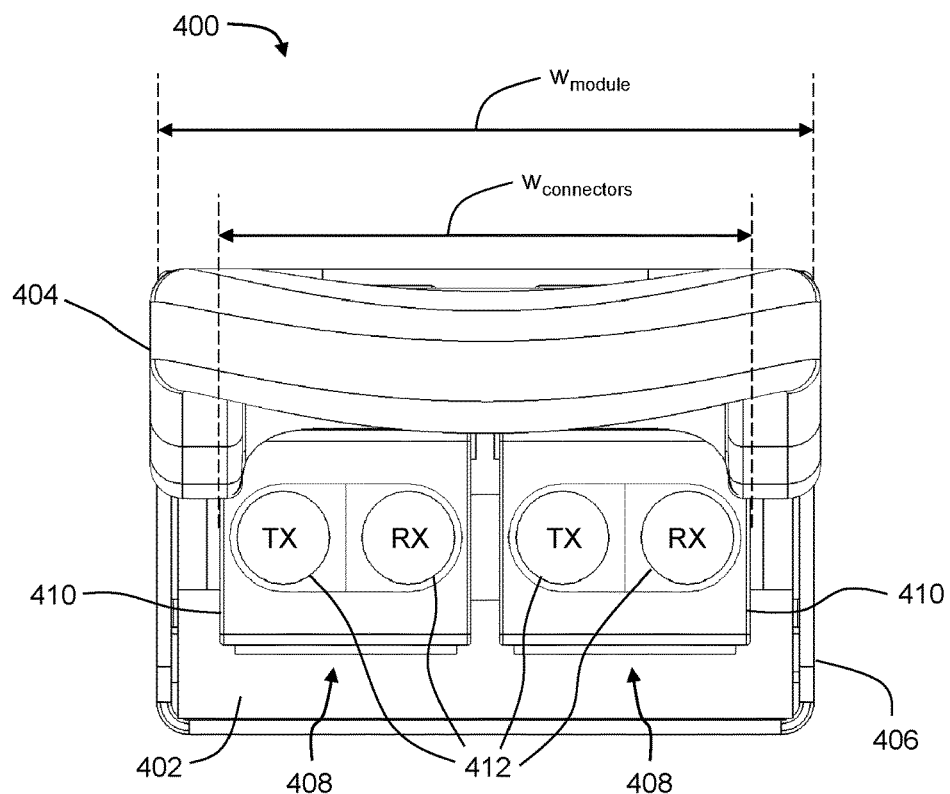

FIGS. 4A and 4B include a perspective view and a fiber-side end view of another example optoelectronic communication module (hereinafter "module") 400, arranged in accordance with at least one embodiment described herein. The module 400 may include a QSFP module, meaning the module 400 may comply with the QSFP MSA. In other embodiments, the module 400 may comply with other MSAs or may not comply with any MSAs. The module 400 includes a housing 402, a pull tab 404, and a slider 406.

The pull tab 404 is coupled to the slider 404 and may be used to remove the module 400 from a host device by pulling on the pull tab 404. The slider 406 (sometimes referred to as a latch follower) is configured to move relative to the housing 402 (within a permitted range of relative motion) in response to sufficient force being exerted thereon by the pull tab 404 to thereby delatch the module 400 from the host device. As indicated above, the '323 patent describes in general how such a slider may operate, although the slider in the '323 patent is bail operated as opposed to pull tab operated in the module 400 of FIGS. 4A and 4B.

The housing 402 as illustrated includes a top shell 402A and a bottom shell 402B coupled together to form a cavity within which various components may be disposed, such as a PCBA, two TOSAs, and two ROSAs. In other embodiments, the housing 402 may include a unitary shell defining the cavity with the foregoing components disposed therein. Two duplex ports 408 are formed in the fiber-side end of the housing 402. Each of the duplex ports 408 is sized and otherwise configured to receive therein a corresponding one of two duplex fiber optic connectors (hereinafter "connector" or "connectors") 410. Each of the connectors 410 may include a duplex mini LC connector.

Each of the connectors 410 includes two ferrules that extend from a module-side end of the connector 410 outward, e.g., in a length direction of the connector 410. One of the ferrules of each of the connectors 410 is configured to be optically aligned with a port of a corresponding one of the two TOSAs disposed within the housing 402, while the other one of the ferrules of each of the connectors 410 is configured to be optically aligned with a port of a corresponding one of the two ROSAs disposed within the housing 402. Each of the ferrules may include an optical fiber to carry optical signals emitted by the corresponding TOSA out to an optical network or to carry optical signals from the optical network to a corresponding one of the ROSAs. Each of the ferrules is optically aligned with a corresponding one of four optical fibers 412 that extend outward from fiber-side ends of the connectors 410 (e.g., two optical fibers 412 extending from each of the connectors 410). The optical fibers 412 aligned with the ferrules that are aligned with the TOSAs are labeled "TX" in FIG. 4B while the optical fibers 412 aligned with the ferrules that are aligned with the ROSAs are labeled "RX" in FIG. 4B.

The TOSAs and ROSAs may be arranged in an alternating pattern as illustrated in FIG. 4B. In other embodiments, the TOSAs and ROSAs may be arranged in other patterns. For instance, the two TOSAs may be arranged side-by-side with each other and the two ROSAs may be arranged side-by-side with each other to either the left or the right of the two TOSAs. Alternatively, the two TOSAs may be arranged side-by-side with each other in the middle with the two ROSAs arranged one on each side of the two TOSAs. Alternatively, the two ROSAs may be arranged side-by-side with each other in the middle with the two TOSAs arranged one on each side of the two ROSAs.

FIG. 4B additionally depicts various measurements associated with the module 400 and the connector 410 of FIGS. 4A and 4B. In particular, a width of the module 400, referred to as the module width $w_{module}$, may be 18.35 mm, similar to FIGS. 1A and 1B, and a width of both connectors 410 with space in between, referred to as the aggregate connector width $w_{connectors}$, may be about 16 mm. The bandwidth of the module 400 of FIGS. 4A and 4B may be, e.g., double the bandwidth of the module 100 of FIGS. 1A and 1B insofar as the module 400 includes twice as many ROSAs and TOSAs which are able to interface with twice as many connectors 410 as the module 100.

Figure 5A:
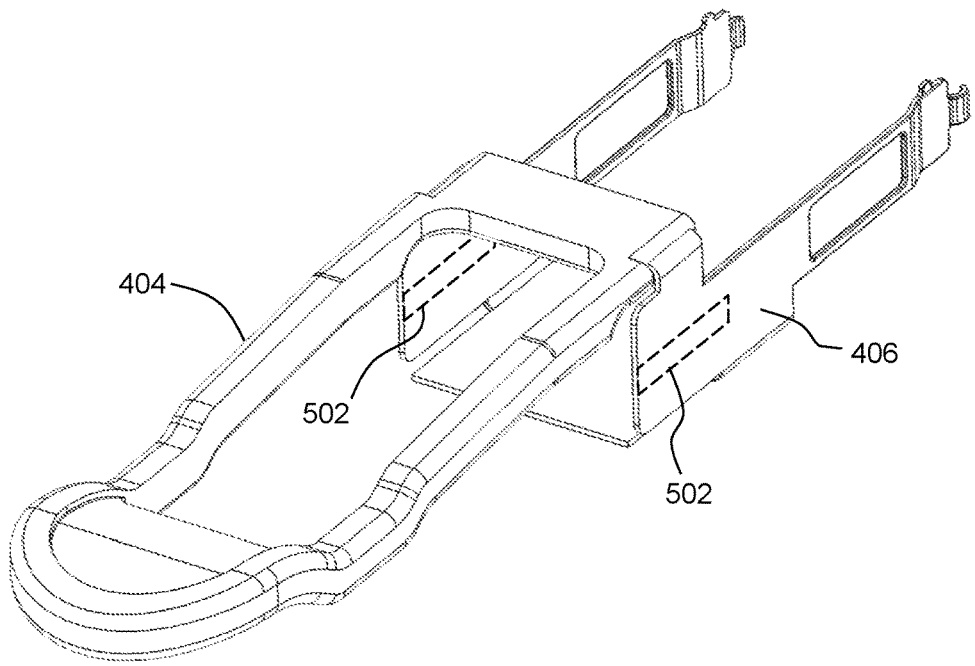
FIGS. 5A and 5B include a perspective view and a fiber-side end view of a pull tab and a slider of the module of FIGS. 4A and 4B.
Figure 5B:
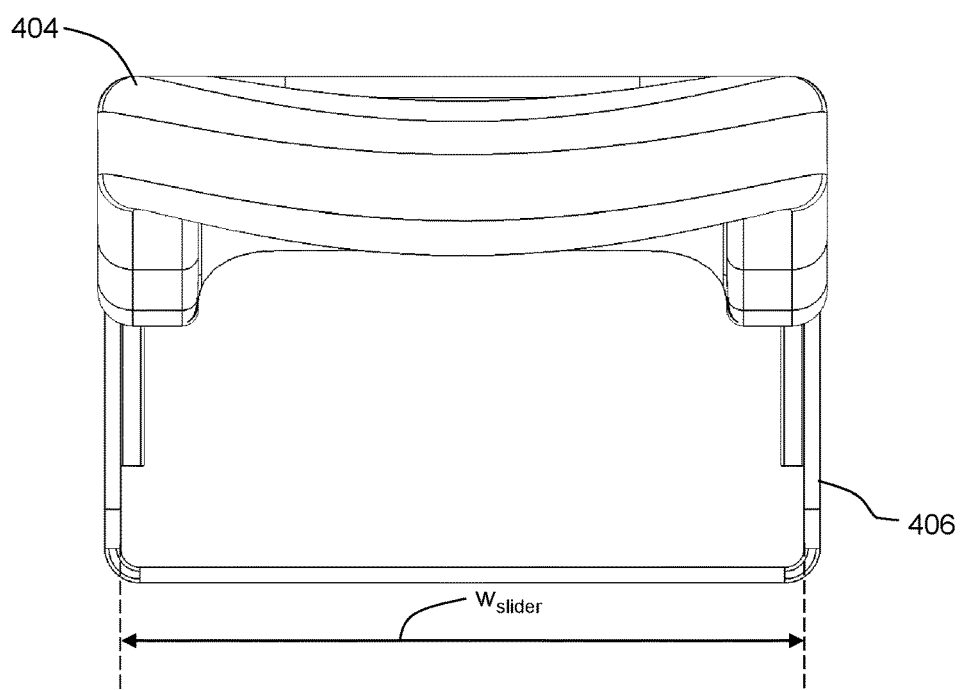

FIGS. 5A and 5B include a perspective view and a fiber-side end view of the pull tab 404 and the slider 406 of the module 400 of FIGS. 4A and 4B, arranged in accordance with at least one embodiment described herein. The pull tab 404 may include plastic or rubber overmolded onto a top of a fiber-side end of the slider 406, and the slider 406 may include formed sheet metal. In other embodiments, the pull tab 404 and/or the slider 406 may include other materials than plastic, rubber, and/or formed sheet metal.

In the instant example, the pull tab 404 is not overmolded onto sides or a bottom of the fiber-side end of the slider 406, in contrast to the implementation of FIGS. 2A and 2B. The absence of the plastic or rubber (or other material) of the pull tab 404 from the sides of the slider 406 increases an opening width of the combined pull tab 404 and slider 406 compared to the opening width (e.g., pull tab width $w_{pull\ tab}$) of the combined pull tab 104 and slider 106 illustrated in FIG. 2B. In particular, the opening width of the combined pull tab 404 and slider 406 of FIG. 5B, referred to as the slider width $w_{slider}$, may be about 17.35 mm, compared to about 14.6 mm for the pull tab width $w_{pull\ tab}$ in FIG. 2B. As a result, the module 400 that includes the pull tab 404 and the slider 406 can accommodate a larger connector and/or multiple connectors with a maximum width (e.g., in aggregate for multiple connectors) that is greater than the maximum width that can be accommodated by the module 100 with the pull tab 104 and the slider 106. Alternatively, one or more cutouts or other features may be formed in the slider 406, as denoted by dashed lines 502 (hereinafter "cutouts 502"), to accommodate an even greater maximum width than can be accommodated by the combined pull tab 404 and slider 406 of FIGS. 5A and 5B.

Figure 6A:
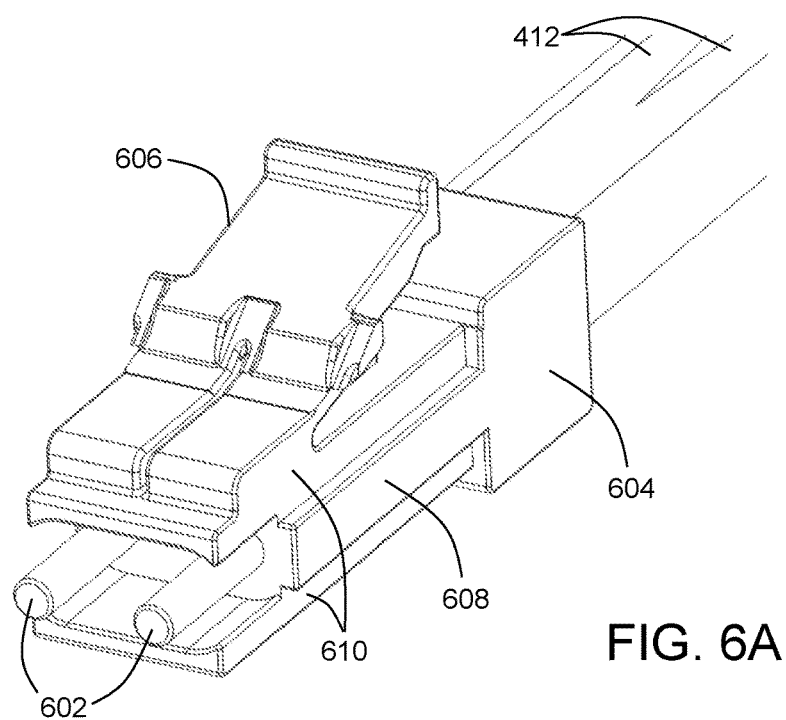
FIGS. 6A and 6B include a perspective view and a module-side end view of a connector and optical fibers of FIGS. 4A and 4B.
Figure 6B:
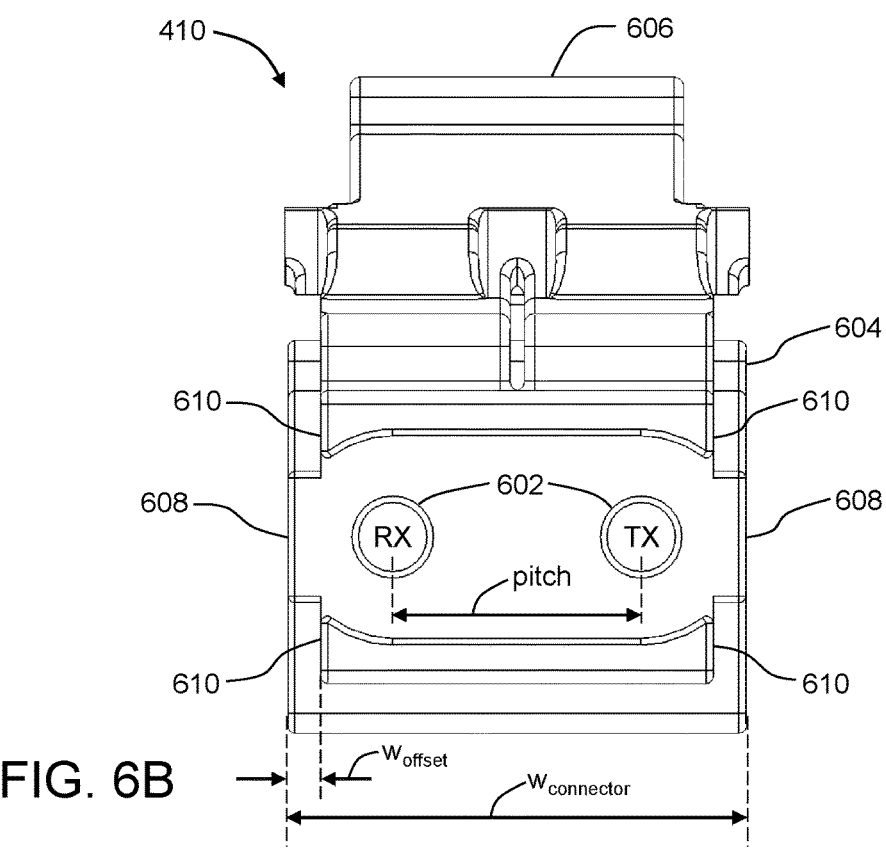

FIGS. 6A and 6B include a perspective view and a module-side end view of one of the connectors 410 and two of the optical fibers 412 of FIGS. 4A and 4B, arranged in accordance with at least one embodiment described herein. Ferrules of the connector 410 are denoted in FIGS. 6A and 6B at 602. Each of the ferrules 602 may include a standard LC ferrule used in LC fiber optic connectors. FIG. 6B additionally indicates that a width of the connector 410, referred to as the connector width $w_{connector}$, may be about 7 mm, and a pitch (e.g., center-to-center spacing) of the ferrules 602 may be about 3.8 mm.

In more detail, the connector 410 includes a body (or housing) 604. The ferrules 602 extend from a module-side end of the body 604 in a length direction of the body 604. The two ferrules 602 are spaced apart from each other in a width direction of the body 604. To allow two of the connectors 410 to be accommodated at a fiber-side end of the module 400, a maximum width of the connector 410 may be limited to not more than half a width (or less) of the fiber-side end of the module 400. For instance, where the module 400 is a QSFP module with a width at its fiber-side end of 18.35 mm, a maximum width of the connector 410 may be not more than half of 18.35 mm, such as 8.5 mm or less, or 7.0 mm or less, or some other value less than 8.5 mm.

As used herein, the "maximum width" of the connector 410 may refer to the maximum width of a portion of the connector 410 that is received in one of the two duplex ports 408 and may optionally not apply to or include other portions of the connector 410, such as a latch tab 606 of the connector 410, which latch tab 606 may have a width greater than the maximum width of the portion of the connector 410 that is received in one of the two duplex ports.

In some embodiments, the connector 410 includes two coil springs (not shown) disposed within the body 604, e.g., one coil spring disposed within the body 604 per ferrule 602. The coil springs may be configured to bias the ferrules 602 against or at least towards the corresponding TOSA or ROSA. The coil springs may be coaxial with the ferrules 602. To accommodate the coil springs within the body 604, the body 604 may include two raised keys 608 or sidewall extensions formed in two opposing sidewalls 610 of the body 604. Each of the raised keys 608 may extend away from a corresponding one of the two opposing sidewalls 610. The maximum width of the portion of the connector 410 configured to be received in one of the two duplex ports 408 of the module 400 of FIGS. 4A and 4B may include the distance between outer surfaces of the two raised keys 608, as denoted by the connector width $w_{connector}$ measurement in FIG. 6B. Each of the two raised keys 608 may be raised relative to (e.g., may extend away from) the corresponding one of the two opposing sidewalls 610 by an offset width $w_{offset}$, which may be about 0.5 mm or some other amount.

The two raised keys 608 may allow the body 604 to internally accommodate the coil springs. Without the two raised keys 608, the coil springs might be at least partially exposed external to the body 604. At the same time, by providing the two raised keys 608 to internally accommodate the coil springs rather than extending the entire opposing sidewalls 610 outward, the housing 402 may be made sufficiently strong to retain the connector 410 in a corresponding one of the duplex ports 408.

Figure 7A:
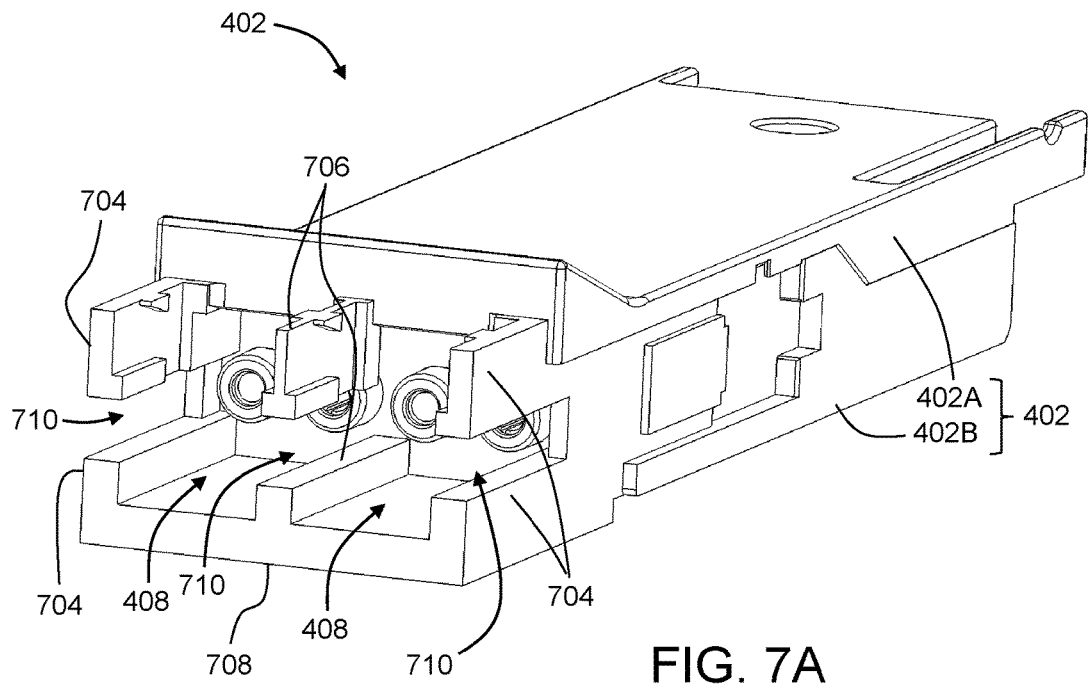
FIGS. 7A and 7B include a perspective view and a cross-sectional view of a housing of the module of FIGS. 4A and 4B.
Figure 7B:
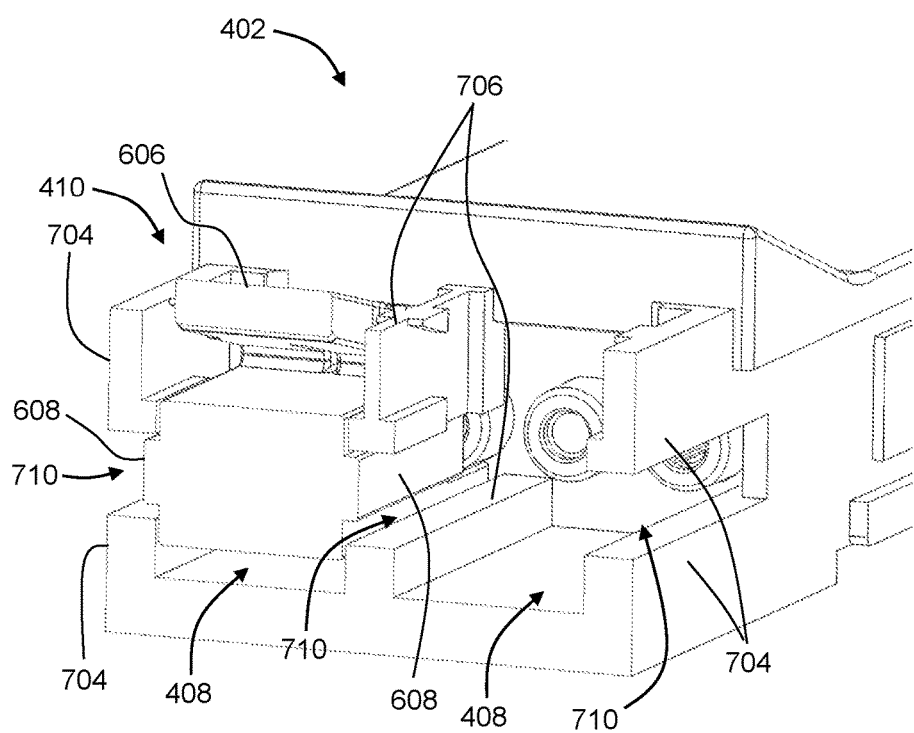

In more detail, FIGS. 7A and 7B include a perspective view and a cross-sectional view of the housing 402, arranged in accordance with at least one embodiment described herein. FIG. 7B additionally includes one of the two connectors 410, with the other being omitted to enable viewing of various aspects of the housing 402. As illustrated in FIG. 7A, a fiber-side end 702 of the housing 402 includes sidewalls 704, a midwall 706, and a bottom wall 708 that together define the two duplex ports 408. The midwall 706 may alternatively or additionally be referred to as a sidewall for each of the duplex ports 408.

Channels 710 or openings are formed in each of the sidewalls 704 and the midwall 706. The channels 710 extend all the way through each of the sidewalls 704 and the midwall 706 in FIG. 7A but may extend only partially therethrough in other embodiments. As illustrated in FIG. 7B, the channels 710 of the housing 402 are configured to accommodate the raised keys 608 of the connector 410. In particular, one of the raised keys 608 of each connector 410 is configured to be received in the channel 710 of a corresponding one of the sidewalls 704, while the other of the raised keys 608 of both connectors 410 is configured to be received in the channel of the midwall 706.

Accordingly, some embodiments described herein may accommodate high port density optical connectors (e.g., connectors 410) for small form factor optical modules (e.g., module 400). Alternatively or additionally, the design of the pull tab 404 and/or the slider 406 may allow maximum connector body width in a high density application. Sheet metal forming for the slider along sides of the module housing (as opposed to overmolded pull tab along the sides) may allow more room for connectors. Alternatively or additionally, connectors described herein may include raised keys or sidewall extensions to accommodate coil springs within the connector bodies, while the slider may include cutouts (e.g., cutouts 502) and/or the module housing may include sidewall or midwall channels (e.g., channels 710) to accommodate the raised keys or sidewall extensions of the connectors.

The connectors 410 described in the context of FIGS. 4A-7B have been described as duplex mini LC connectors. Principles described herein may be applied to other style fiber optic connectors instead of or in addition to LC connectors to miniaturize such other style fiber optic connectors in a similar manner. Additionally, the module 400 described in the context of FIGS. 4A-4B has been described as a QSFP module. Principles described herein may be applied to modules with other form-factors and/or to modules that comply with other MSAs.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A fiber optic connector, comprising:
    a body coupled to optical fibers at a fiber-side end of the body, the body comprising:
        two opposing sidewalls spaced apart from each other in a width direction; and
        two raised keys included in the two opposing sidewalls, each of the two raised keys running at least a portion of a length of a corresponding one of the two opposing sidewalls and extending opposite each other from the two opposing sidewalls, each of the two raised keys extending outward from the corresponding one of the two opposing sidewalls in a direction orthogonal to the length of the corresponding one of the two opposing sidewalls;
    a first fiber ferrule that extends in a length direction of the body from a module-side end of the body, the first fiber ferrule configured to be optically aligned with a port of a first optical subassembly of an optoelectronic communication module; and
    a second fiber ferrule that extends in the length direction of the body from the module-side end of the body, the second fiber ferrule spaced apart from the first fiber ferrule in the width direction of the body, the second fiber ferrule configured to be optically aligned with a port of a second optical subassembly of the optoelectronic communication module;
    wherein a maximum width in the width direction of a portion of the body configured to be received in a duplex port of the optoelectronic communication module is less than half a width of a fiber-side end of the optoelectronic communication module, and the maximum width of the portion of the body is a distance between outer surfaces of the two raised keys.

2. The fiber optic connector of claim 1, wherein:
    the optoelectronic communication module comprises a Quad Small Form-factor Pluggable (QSFP) module; and
    the width of the fiber-side end of the QSFP module is 18.35 millimeters (mm).

3. The fiber optic connector of claim 2, wherein the maximum width of the portion of the body is less than or equal to 8.5 mm.

4. The fiber optic connector of claim 3, wherein the maximum width of the portion of the body is less than or equal to 7.0 mm.

5. The fiber optic connector of claim 1, further comprising:
    a top side that connects the two opposing sides; and
    a latch tab that extends upward from the top side.

6. The fiber optic connector of claim 1, wherein the fiber optic connector comprises a duplex mini Lucent Connector (LC) fiber optic connector.

7. The fiber optic connector of claim 1, wherein each of the first fiber ferrule and the second fiber ferrule includes a standard Lucent Connector (LC) ferrule used in LC fiber optic connectors.

8. The fiber optic connector of claim 1, wherein the optoelectronic communication module comprises:
    a housing;
    a first duplex port formed in a fiber-side end of the housing and configured to receive a first duplex fiber optic connector comprising the fiber optic connector, the first duplex port comprising the port of the first optical subassembly and the port of the second optical subassembly;
    a second duplex port formed in the fiber-side end of the housing spaced apart from the first duplex port in a width direction of the housing and configured to receive a second duplex fiber optic connector, the second duplex port comprising a port of a third optical subassembly and a port of a fourth optical subassembly;
    a pull tab latch that includes:
        a slider that surrounds a top, two sides, and a bottom of the fiber-side end of the housing; and a pull tab overmolded over at least a portion of a top of the slider and not overmolded over any of two sides or a bottom of the slider.

9. The optoelectronic communication module of claim 8, wherein a width between inside surfaces of the two sides of the slider is about 17.35 millimeters (mm).

10. The optoelectronic communication module of claim 9, wherein a maximum width of each of the first and second duplex fiber optic connectors is less than one half of the width between inside surfaces of the two sides of the slider.

11. The optoelectronic communication module of claim 10, wherein the maximum width of each of the first and second duplex fiber optic connectors is less than 8.5 millimeters (mm).

12. The optoelectronic communication module of claim 11, wherein the maximum width of each of the first and second duplex fiber optic connectors is less than 7.0 mm.

13. The optoelectronic communication module of claim 8, wherein:
the first duplex port comprises a first channel formed in a first sidewall of the first duplex port and a second channel formed in a second sidewall of the first duplex port to accommodate two raised keys that extend from two opposing sides of the first duplex fiber optic connector; and
the second duplex port comprises a first channel formed in a first sidewall of the second duplex port and a second channel formed in a second sidewall of the second duplex port to accommodate two raised keys that extend from two opposing sides of the second duplex fiber optic connector.

14. The optoelectronic communication module of claim 8, wherein the slider comprises a first cutout formed in a first one of the two sides and a second cutout formed in a second one of the two sides, the first cutout configured to accommodate a raised key that extends outward from one side of the first duplex fiber optic connector and the second cutout configured to accommodate a raised key that extends outward from an opposite side of the second duplex fiber optic connector.

15. The optoelectronic communication module of claim 8, wherein the optoelectronic communication module comprises a Quad Small Form-factor Pluggable (QSFP) module.

16. The optoelectronic communication module of claim 15, wherein each of the first duplex fiber optic connector and the second duplex fiber optic connector comprises a duplex mini Lucent Connector (LC) fiber optic connector.

17. The optoelectronic communication module of claim 16, wherein a bandwidth of the QSFP module is double a bandwidth of a QSFP module comprising a single duplex port configured to receive a duplex standard LC connector.

18. The fiber optic connector of claim 1, wherein each of the two raised keys is raised relative to the corresponding one of the two opposing sidewalls by 0.5 millimeters.

19. A fiber optic connector, comprising:
a body coupled to optical fibers at a fiber-side end of the body;
a first fiber ferrule that extends in a length direction of the body from a module-side end of the body, the first fiber ferrule configured to be optically aligned with a port of a first optical subassembly of an optoelectronic communication module; and
a second fiber ferrule that extends in the length direction of the body from the module-side end of the body, the second fiber ferrule spaced apart from the first fiber ferrule in a width direction of the body, the second fiber ferrule configured to be optically aligned with a port of a second optical subassembly of the optoelectronic communication module;
wherein a maximum width in the width direction of a portion of the body configured to be received in a duplex port of the optoelectronic communication module is less than half a width of a fiber-side end of the optoelectronic communication module, and a pitch of the first fiber ferrule and the second fiber ferrule is 3.8 millimeters.

* * * * *